Aug. 26, 1969    A. W. BLANSHINE ET AL    3,463,024
SPRING LOADED CAM ADJUSTED IDLER
Filed June 6, 1968
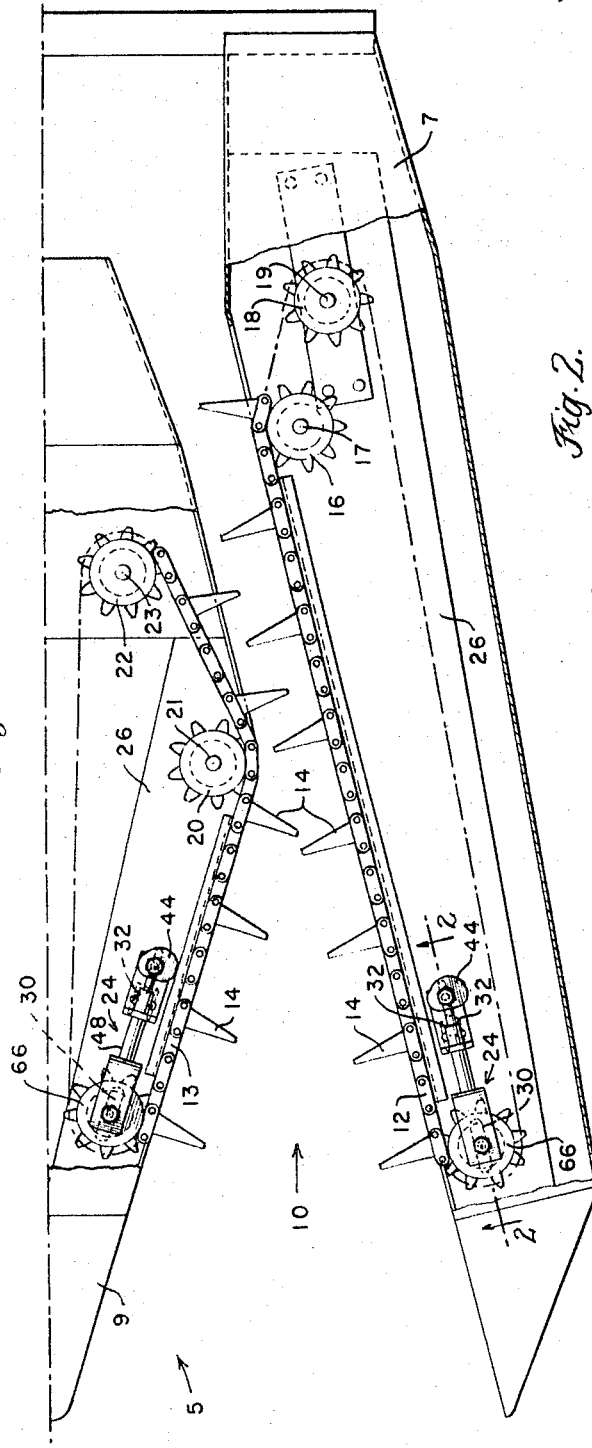
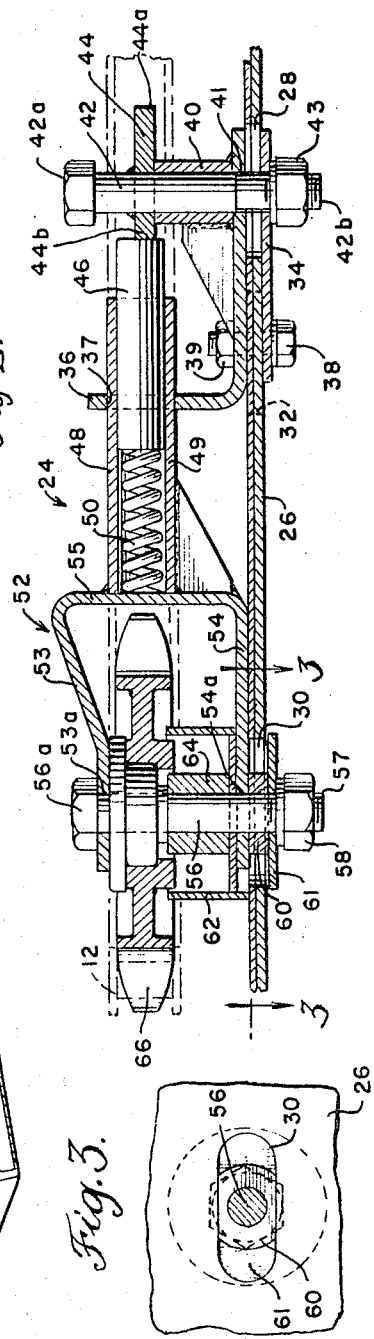
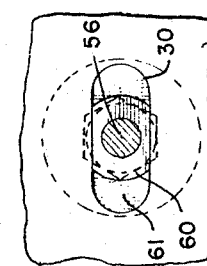
INVENTORS
ALLISON W. BLANSHINE
& EDWARD C. PROCTER
BY *Joseph A. Brown*
ATTORNEY

United States Patent Office 3,463,024
Patented Aug. 26, 1969

3,463,024
SPRING LOADED CAM ADJUSTED IDLER
Allison W. Blanshine, Lititz, and Edward C. Procter, New Holland, Pa., assignors to Sperry Rand Corporation, New Holland, Pa., a corporation of Delaware
Filed June 6, 1968, Ser. No. 735,021
Int. Cl. F16h 7/08
U.S. Cl. 74—242.11　　　　　　　　　　　　7 Claims

ABSTRACT OF THE DISCLOSURE

A cam adjusted spring loaded idler for adjusting the tension on a driven chain including a slidably mounted cam plate with a rotatable cam thereon, a slidably mounted idler support means connected to the cam plate by a tubular member, having a spring biased cam follower disposed therein, the combination of elements being such that adjustment of the chain tension is achieved by first retracting the cam to an "off" position, sliding the cam plate relative to a connecting surface, securing the cam plate in the adjusted position relative to the connecting surface and, finally, rotating the cam into maximum engagement with the cam follower so that the idler sprocket support means is caused to slide relative to the connecting surface, increasing the chain tension.

Background of the invention

The present invention relates to a device which is generally adapted to provide a simple means of adjustment of the tension applied to an endless driven chain. Specifically, the adjustment device is adapted for use on agricultural machinery, such as the row crop attachment, or corn header for a harvesting machine, to provide a means for achieving optimum gathering chain tightness.

Conventionally, header attachments, like the one shown in U.S. Patent 3,127,723, Procter et al., use an endless chain driven over a plurality of sprockets, each chain having a plurality of crop engaging fingers fixed thereto to gather the crop materials and convey them to the harvesting machine. The parts of such machines, due to the operational environment in which they are used, normally are subjected to substantial wear. A particular problem in such header devices is wear of the chain, sprockets and sprocket shafts. As the machine is operated over sustained periods, each gathering chain tends to loosen as it is driven over the sprockets. The sprockets themselves wear down and become misaligned. If these situations are left uncorrected, the chain may, after encountering an obstruction, or under load conditions, be caused to ride off one or more of the sprockets causing a machine shutdown.

In some cases, when a farmer attempts to tighten or take up slack in the chain he will adjust the idlers or the tension thereon to a position such that maximum tension is applied to the chain. The problem here, however, is that even with the most advanced engineering techniques and manufacturing skills it is impossible to assure that there will not be eccentricities in the chain, the idler sprockets, the shafts, or combinations of all of these. As sometimes happens, the farmer when making the adjustment to the chain tension, adjusts the chain to maximum tension in the so called "low point," or at a point where the eccentricities involved have not yet come into play. Since the chain has already been tightened to its fullest extent, and there is no associated yieldable feature included with the adjustment device, when the eccentricity involved actually becomes effective the load on the chain, sprockets and sprocket shafts increases to a point where substantial damage will occur if the machine is continually operated in the adjusted position. The damage usually results in a broken chain, but such excessive tension might also cause bending of the sprocket shafts or excessive wear on the sprocket teeth. While the breakage of the chain will cause immediate shutdown of the machine, bent sprocket shafts or worn sprockets will cause eventual machine damage, and in some cases, the machine damage will be a more extensive than that caused by the chain breakage.

Similarly, a crop gathering chain which has been tightened to its maximum is unable to take prolonged jostling which occurs during normal operation. This excessive loading will also cause the breakage, wear and misalignment problems.

Summary of the invention

The cam adjusted spring loaded idler described by the present invention has been designed to effectively eliminate the problems previously encountered when using conventional chain adjusting means. The adjustment device is provided with a spring loaded idler which effectively eliminates the problems previously incurred when maximum tension is applied to the chain. The built in eccentricities that may occur in normal operation are taken up by the yieldable sprocket, while at the same time, the biased sprocket applies the necessary tension to the chain to keep it running smoothly over the idlers.

Tension adjustment devices are generally installed in an enclosed position relatively near to the ground on the header devices. The lack of space available makes it nearly impossible to apply an adjusting wrench because the wrench must swing vertically and there is no vertical clearance. The adjustment device presently described is intended to fit in a very small space with all the adjustments being made in a horizontal plane on the top of the chain board. With all the adjustment positions on the same side of the chain board, the adjusting wrench can easily swing above or below the chain itself.

The simple adjustment is achieved by a device including a rotatable cam adjustably mounted on a surface, an idler mounted in a support means spaced from the cam and which is adjustable with respect to the surface in response to a force applied thereto by a spring and a cam follower disposed in a connecting tube between the cam and the idler. The spring loaded idler is easily adjustable by movement of the cam and its adjustable support while it will also provide a means for constant chain tension adjustment during ordinary operation of the machine.

During normal operating conditions for such a device it is more than possible that the device will encounter such obstructions as large rocks or stumps. Application of the present device as a tension adjusting means on the chain will considerably lessen the danger of chain failures or sprocket shaft bending due to the excessive overloading conditions encountered as the chain and fingers attempt to draw the rock or stump into the machine. The yieldable feature in this adjusting device comes into play in this instance so that the amount of tension applied by the sprocket idlers is decreased.

The present adjustment device provides a further advantage over available devices inasmuch as only a wrench is necessary to make the adjustments in the chain tension. The clamping and locking means are used to hold the device in a fixed position. All are easily accessible from the outside and are within easy reach to the farmer, or machine operator.

Description of the drawings

FIGURE 1 is a partial section view of a conventional header, or row crop attachment for a harvesting machine showing the relationship of the adjustment device of the present invention and the crop gathering chain;

FIGURE 2 is an enlarged section view taken along the lines 2—2 of FIGURE 1, showing in detail the elements of the adjustment device; and FIGURE 3 is a section view taken along the lines 3—3 of FIGURE 2 showing the relationship of the washers and an elongated guide slot provided in the chain board.

Description of preferred embodiment

Referring now to FIGURE 1 of the drawings, a conventional corn harvesting header, or row crop attachment 5 is of the type adapted to be attached to a harvesting machine (not shown), such as a forage harvester or a combine. The header 5 includes an outer housing structure 7 and a divider element 9 which cooperate to form a V-shaped, fore-and-aft extending, crop receiving passage 10. The housing 7 encloses a chain 12, having a plurality of crop engaging fingers 14 spaced therealong, which chain is driven over sprockets 16 and 18, rotating on shafts 17 and 19, respectively and a cam adjusted spring loaded idler 24. The chain 12 and the associated crop engaging fingers 14 extend into passage 10 along the inside surface of housing 7. Similarly, divider 9 encloses a chain 13 and its associated crop engaging fingers 14, the chain being driven over sprockets 20 and 22, rotating on shafts 21 and 23, respectively, and a cam adjusted spring loaded idler 24. The two chains 12 and 13 and the fingers 14 cooperate in passage 10 to engage crop material and draw it upwardly therein, toward the harvesting machine (not shown).

As best shown in FIGURES 1 and 2, the cam adjusted spring loaded idler 24 is mounted on a flat planar surface or chain board 26, having a plurality of slots 28, 30 and 32 spaced theeralong. Beneath the chain board 26, adjacent the slots 28 and 32 is a clamp plate 34. Above the chain board 26, and also adjacent the slots 28 and 32, is an L-shaped cam plate 36, having a first leg extending transversely with respect to the chain board and a second leg transverse to the first leg and extending parallel to and engagement with the chain board 26. A pair of clamping bolts 38 are provided and extend through the cam plate 36, slots 32 and clamp plate 34. A nut 39 is adapted to threadably engage one end of the bolt 38 on the cam plate side of the chain board. Upstanding from the second leg of cam plate 36 is a bearing member 40 concentrically mounted with respect to an aperture 41 formed in the second leg of the cam plate. Disposed within the bearing 40 and extending through cam plate 36, slot 28 and clamp plate 34 is a locking means, or bolt 42, having an upper headed portion 42a and a lower threaded portion 42b adapted to receive a nut 43. Fixed to bolt 43, intermediate the ends thereof, is a cam means 44. The cam profile is such that it has extended rounded portion 44a and a flat portion 44b. The flat portion 44b is disposed relatively close to bolt 42, as shown in FIGURES 1 and 2.

Spaced from the cam plate 36 along the chain board 26 is an idler support means 52. The support means 52 is comprised of a pair of legs 53 and 54 which extend generally parallel to chain board 26 and away from cam plate 36. Connecting the legs 53 and 54 on the ends adjacent the cam plate is a bight portion 55. Through suitable apertures 53a and 54a passes an idler shaft 56, having an exis parallel to the first leg of cam plate 36 with a headed portion 56a and a threaded portion 57 adapted to threadably engage a nut 58. Symmetrically disposed with respect to shaft 56 is a sleeve portion 62 having a floor 63. Within the sleeve and surrounding the shaft is a bearing 64 adapted to support the shaft 56 on which an idler sprocket 66 is rotatably connected intermediate the ends thereof between the yoke legs as shown in FIGURE 2.

A washer 60 having flat sides, best shown in FIGURE 3, is adapted to slidably engage the sides of slot 30 in chain board 26. The washer 60 is slightly thicker than the thickness of the chain board so that when the elements are clamped together, the washer 60 will remain slidably engageable with respect to the chain board because washer 61, interposed between washer 60 and nut 58 on shaft 56, does not engage the under surface of the chain board. The clamping action provided by the shaft 56 and nut 58 serves only to clamp the yoke with respect to the washer 60.

Connecting the cam plate 36 to the idler support 52 is a tubular member 48 which is split along the length of the tube at the bottom thereof. The split portion 49 permits the escape of dirt and other foreign particles which might work their way into the tube. One end of the tube is securely connected to the bight portion 55 of yoke 52 by welding or the like, while the other end extends transversely outwardly from bight 55 through an aperture 37 in the first leg of cam plate 36. The connection between the cam plate and the tube is slidable rather than being fixed for reasons to be hereinafter set forth in detail.

Within the tubular connecting means 48 there is disposed a cam follower 46 and a coil spring 50 which abuts against bight portion 55 of yoke 52 and one end of the cam follower 46. The spring serves to bias the follower 46 outwardly of the tube toward and into engagement with cam 44.

In operation, when an adjustment is to be made in the chain tension, the locking bolt 42 is first loosened and the cam is rotated to the retarded or "off" position so that the cam body 44a is to the rear and the cam follower 46 engages the flat portion 44b. This particular position is shown in FIGURES 1 and 2. Next the clamping bolts 38 are loosened so that the cam plate is free to slide relative to the chain board 26 and the idler support means 52. The cam plate is adjusted by hand toward the idler support in the slots 28 and 32, and then the clamping bolts 38 are tightened down, fixing the clamp plate 34 and cam plate 36 in the adjusted position relative to the chain board. The cam is then rotated such that cam portion engages the follower and forces it against the bias of spring 50 into tube 48. Approximately one-eighth of an inch of the follower should be left extended from the tube. The force exerted on the follower and spring by the cam is transferred to the yoke 52 causing it to slide in slot 30 away from the newly adjusted cam plate, and, thereby, applying tension to the chain.

During normal operation, the spring loaded gathering chain idlers are self-adjusting for the proper tension to be applied to the driven chain. As the sprockets begin to wear or the chain begins to stretch, the additional adjustment as described above will be required.

The spring loading of the idler results in further advantages over and above the relatively simple adjustment feature inasmuch as the device will also take up shock loads encountered during normal operating conditions. Since the idler sprocket can yield against the spring bias, the increased tension applied to the chain due to contact with an obstruction, or the like, can be taken up to the extent of total compressibility of the spring. If the spring is totally compressed under such extreme loading conditions and still further loading is applied, then shear bolts (not shown) built into the system shear to prevent damage which might be caused by the increased loading.

Having thus described our invention, what we claim is:

1. A cam adjusted spring loaded idler for adjusting the tension on a driven crop gathering chain for a harvesting machine comprising in combination:

a support having a planar surface;
a cam plate mounted on one side of said support;
a cam;
locking means for mounting and actuating said cam on said cam plate;
an idler support means mounted on the planar surface of said support spaced from said cam plate on the same side of said support and slidable on said planar surface toward and away from said cam plate;
an idler sprocket over which the chain is driven mounted in said idler support means;
mounting means for connecting said cam plate to said support to adjust the space between said cam plate and said idler;

connecting means, including a cam follower, connecting said cam to said slidable idler support means; and biasing means disposed in said connecting means between said idler support means and said cam follower.

2. A cam adjusted spring loaded idler for adjusting the tension on a driven crop gathering chain for a harvesting machine as recited in claim 1, wherein said cam plate comprises an L-shaped member having a first leg extending away from said support and a second leg extending parallel to and engaging said support.

3. A cam adjusted spring loaded idler for adjusting the tension on a driven crop gathering chain for a harvesting machine as recited in claim 1, wherein said mounting means for connecting said cam plate to said surface comprises a bolt, having a threaded end, a nut threadably engageable with said bolt and a clamp plate disposed beneath said support, said support having a slot and said bolt extending through said clamp plate, said slot in said support and said cam plate with said nut in contact with said cam plate.

4. A cam adjusted spring loaded idler for adjusting the tension on a driven crop gathering chain for a harvesting machine as recited in claim 1, wherein a bearing member, having said locking means extending therethrough, is connected to said cam plate, said locking means extending through a slot in said support and connectable to said support.

5. A cam adjusted spring loaded idler for adjusting the tension on a driven crop gathering chain for a harvesting machine as recited in claim 1, wherein said idler support means comprises a yoke member, having a pin extending therethrough for mounting said idler sprocket, said pin extending through a first washer and a second washer.

6. A cam adjusted spring loaded idler for adjusting the tension on a driven crop gathering chain for a harvesting machine as recited in claim 5, wherein said first washer is slidably disposed in a slot in the planar surface of said support, the thickness of said washer being slightly larger than the thickness of the slot and said second washer engaging the under surface of said first washer, whereby said pin clamps said yoke to said first washer.

7. A cam adjusted spring loaded idler for adjusting the tension on a driven crop gathering chain for a harvesting machine comprising in combination:

a support having a planar surface and a plurality of spaced apart slots therein;

an L-shaped cam plate mounted on one side of said support having a first leg extending away from said support and a second leg extending parallel to and in engagement with said support;

a cam;

a locking means extending through and fixed to said cam, said second leg of said cam plate and one of said slots in said support and connectable to said support for mounting said cam on said cam plate and actuating said cam;

an idler support means, including a yoke member and a pin, slidably engageable with the planar surface of said cam support and spaced from said cam plate on the same side of said support, said yoke having a pair of spaced legs extending generally parallel to said support and a bight portion connecting said legs;

an idler sprocket over which the chain is driven mounted between the legs of said yoke on said pin having an axis extending perpendicular to said planar surface;

a first washer having parallel sides slidably mounted in another of said slots in said support, the thickness of said slot being less than the thickness of said washer and said pin extending through said first washer;

a second washer larger in diameter than said first washer also mounted on said pin beneath said first washer and said planar surface of said support, and said pin and second washer connecting said yoke to said first washer;

mounting means for connecting said cam plate to said support to adjust the space between said cam plate and said idler, said mounting means including a bolt and a clamp plate, said bolt extending through said second leg of said cam plate, through a slot in said support and through said clamp plate disposed beneath said support;

connecting means comprising a tubular member fixed to said bight portion and slidably engageable with said first leg of said cam plate and a cam follower disposed in said tube and engaging said cam; and biasing means disposed in said connecting means between said bight portion and said cam follower, whereby said cam yieldably biases said idler sprocket away from said cam plate.

References Cited

UNITED STATES PATENTS

| | | | |
|---|---|---|---|
| 2,910,880 | 11/1959 | Procter. | |
| 3,113,467 | 12/1963 | McKenna | 74—242.14 |
| 3,285,085 | 11/1966 | Graham | 74—242.14 |

FRED C. MATTERN, Jr., Primary Examiner

J. A. WONG, Assistant Examiner

U.S. Cl. X.R.

74—242.14